US005193602A

United States Patent [19]

Morales

[11] Patent Number: 5,193,602
[45] Date of Patent: Mar. 16, 1993

[54] CANVAS COVER FOR WINDOW FRAMES

[76] Inventor: Teresa J. Morales, 235 SW. Le Jeune Rd., Miami, Fla. 33134

[21] Appl. No.: 806,233
[22] Filed: Dec. 12, 1991
[51] Int. Cl.[5] .......... E06B 9/32
[52] U.S. Cl. .......... 160/89; 160/243
[58] Field of Search .......... 160/108, 109, 89, 116, 160/180, 243, 242; 135/117

[56] References Cited

U.S. PATENT DOCUMENTS

| | | | |
|---|---|---|---|
| 1,615,931 | 2/1927 | Cann | 160/243 X |
| 1,648,311 | 11/1927 | Johnson | 160/243 X |
| 2,336,899 | 12/1943 | Stern | 160/243 |
| 2,745,420 | 5/1956 | Zitomer . | |
| 3,746,386 | 7/1973 | Woodward | 135/117 X |
| 3,929,146 | 12/1975 | Maiken | 135/117 X |
| 4,013,942 | 6/1977 | Shelton | 160/180 X |

*Primary Examiner*—Blair M. Johnson
*Attorney, Agent, or Firm*—J. Sanchelima

[57] ABSTRACT

A cover for window frames that permit a user to selectively choose the frames where the covers will be mounted in an enclosure to protect the inside from the elements. An opening in the canvas that is mounted to the frame is selectively covered and uncovered to expose it. Velcro pads are used to keep the roll up cover sheet attached to the canvas when distended and in the rolled up position when the opening is exposed. String members and diverting roller assemblies are used to readily roll up and down the roll up sheet. A screen is super imposed over the opening to prevent insects from penetrating inside the enclosed structure.

5 Claims, 2 Drawing Sheets

CANVAS COVER FOR WINDOW FRAMES

BACKGROUND OF THE INVENTION

1. Field of the Invention

The present invention relates to canvas covers for window frames, and more particularly, to those covers used in window frames provided with a peripheral slot.

2. Description of the Related Art

Applicant believes that the closest reference corresponds to U.S. Pat. No. 2,745,420 issued to A. Zitomer. However, it differs from the present invention because the patented enclosure is only placed over the entire structure and does not have the ability of being selectively placed in predetermined frames. Also, no mechanisms for exposing or protecting from the elements a predetermined opening in the canvas.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a window frame canvas cover that can be selectively mounted to predetermined frames in a screen enclosure to enhance protection of the enclosure having the window frames against the elements.

It is another object of this invention to provide a window frame canvas cover that includes a see through area that can be selectively exposed and covered by a user.

It is still another object of the present invention to provide a window frame canvas cover that is washable.

It is yet another object of the invention to provide such a device that is inexpensive to manufacture and maintain while retaining its effectiveness.

Further object of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
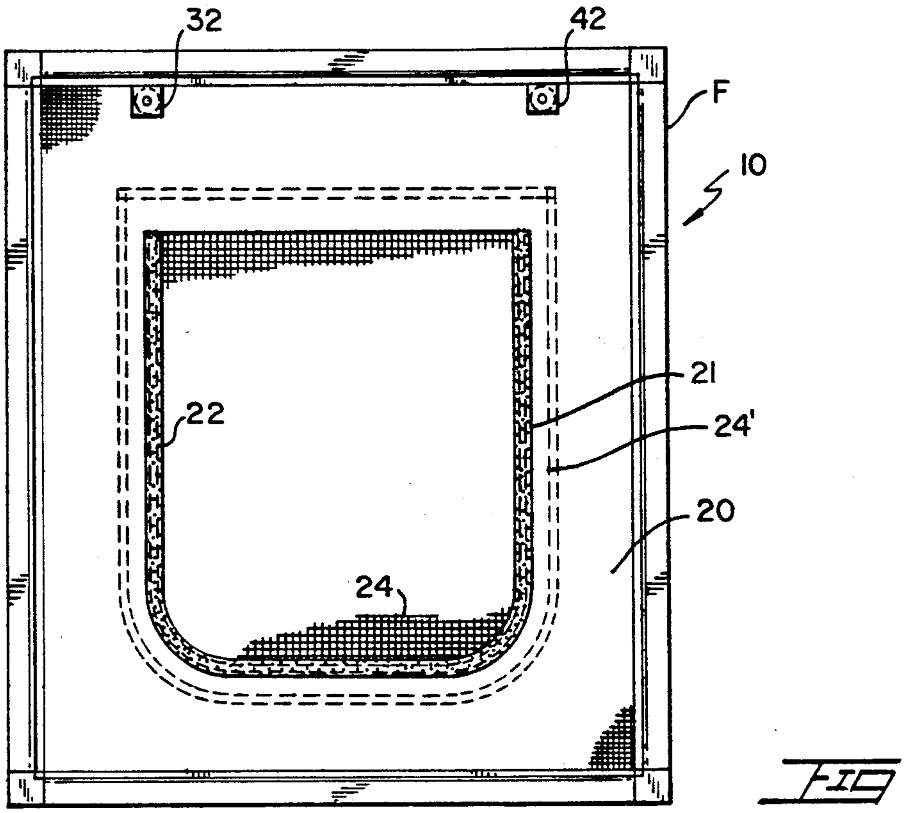
FIG. 1 represents an elevational view of the window frame canvas cover subject of the present application as it is seen from inside the enclosure where it is mounted.
Figure 4A:
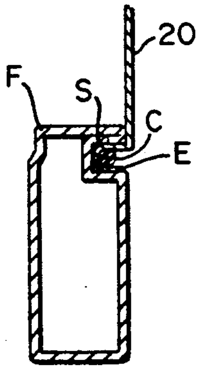
FIG. 4A is a detail representation of a cross-section of frame F showing how the canvas sheet is held in place.

Referring now to FIG. 1, where the present invention is generally referred to with numeral 10, it can be observed that it basically includes canvas sheet 20 that has dimensions slightly larger than the internal dimensions of frame F. Frames F are conventional screen frames that include a peripheral slot S that keeps in place under compression resilient cord C thereby sandwiching in between the screen, as best seen in FIG. 4A. The present invention can be implemented by removing the conventional screen in existing screen enclosures by first removing cord C. Then, canvas sheet 20 is mounted to frame F by forcing the edges inside slot S and pressing in cord C. The dimensions of canvas sheet 20 are such that the ends E of canvas sheet 20 do not protrude outwardly from the slot or any excess is cut by the user. Canvas sheet 20 is sufficiently thin to permit its insertion in slot S.

Figure 2:
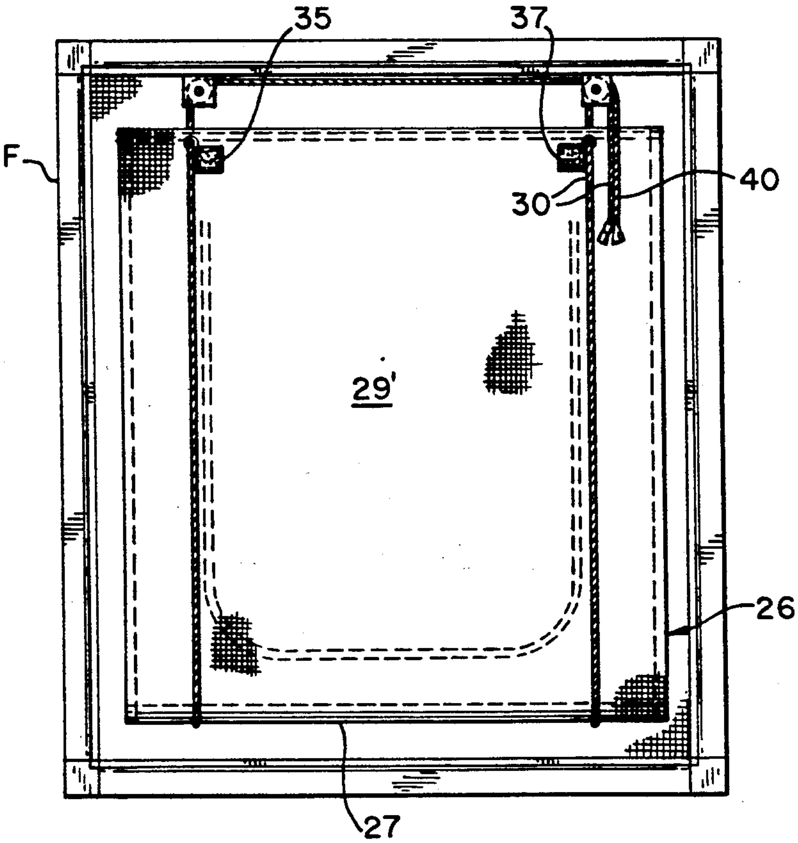
FIG. 2 shows an elevational view of the window frame canvas cover as in FIG. 1 with roll up sheet completely distended covering opening 22.

Canvas sheet 20 includes an opening 22 wherein a screen sheet 24 has been mounted thereby covering opening 22. Preferably, screen sheet 24 is sewn to canvas sheet 20 at 24' and it is intended to keep insects away from the enclosed area. Roll up sheet 26, as seen in FIG. 2, has dimensions that are sufficiently larger than opening 22 so that it can be completely covered when sheet 26 is extended, aided by weight member 23 on lower end 27. Also, Velcro pads 21 are provided on the periphery of opening 22 and corresponding mating Velcro pads 25 are mounted to outer surface 29 of sheet 26. Velcro pads 21 and 25 insure that sheet 26 stays adjacent to canvas sheet 20 thereby insuring that opening 22 is covered to prevent light, heat, rain or wind through.

As seen in FIG. 2, Velcro pads 35 and 37 are mounted to the outer surface of sheet 26 and when sheet 26 is rolled up, they cooperatively engage with Velcro pads 25 thereby keeping sheet 26 rolled up in place. Inner surface 29' of roll up sheet faces the inside of the enclosure.

Figure 3:
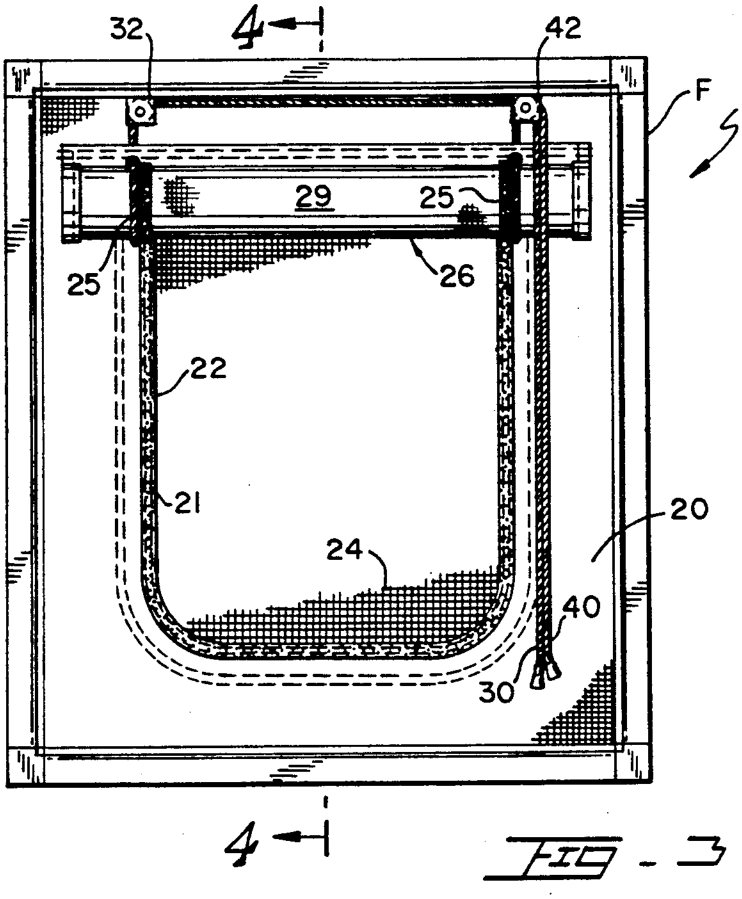
FIG. 3 illustrates the cover shown in FIG. 2 with the roll up sheet rolled up exposing the see-through screen.
Figure 4:
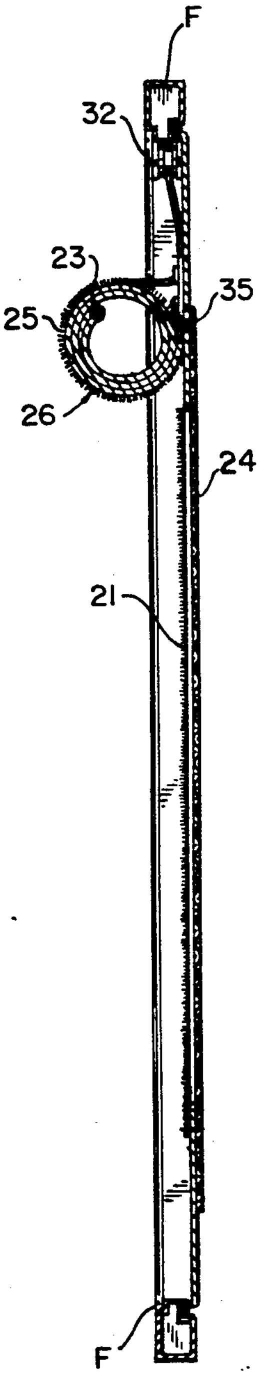
FIG. 4 is a representation of side elevational cross-section taken along line 4—4 in FIG. 3.
Figure 5:
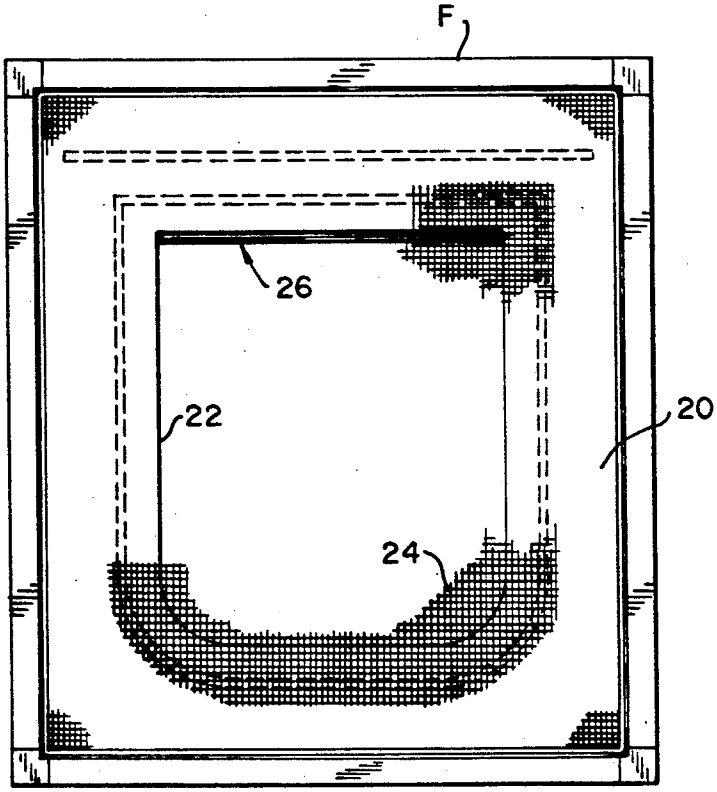
FIG. 5 represents an elevational view of the window frame canvas as it is seen from outside the enclosure where it is mounted.

Strings 30 and 40, as seen in FIG. 3, are used to cause roll up sheet 26 to roll up and down in cooperation with roller assemblies 32 and 42. A longitudinal weight member 23 is inserted at the end of roll up sheet 26 to urge distension of roll up sheet 26. Roller assembly 42 preferably of the type that locks strings 30 and 40 at any given point leaving sheet 26 rolled up, distended or in any position in between. Velcro pads 35 and 37 further secure sheet 26 when completely rolled up.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A cover in combination with a window frame with a peripheral slot and resilient cord means that is cooperatively received within said slot, and said window frames mounted to form an enclosure and said cover comprising:

A. a canvas sheet having dimensions that are slightly larger than the internal dimensions of said window frames and securely mounted within said slot of said window frame and kept inside by the compression force of said resilient cord means, and said canvas sheet including an opening with an upper edge and said canvas sheet further including an outside surface facing the outside of said enclosure and an inside surface facing the inside of said enclosure;

B. a screen member mounted to said canvas sheet so that said opening is covered;

C. a roll up sheet having dimensions larger than said opening, and said roll up sheet having uppermost and lowermost ends, and said uppermost end being mounted to said upper edge of said opening so that when said roll up sheet is rolled up said opening is exposed and conversely when said roll up sheet is distended said opening is covered and said roll up sheet has outer and inner surfaces; and D. means for rolling up and down said roll up sheet.

2. The cover set forth in claim 1 wherein said canvas sheet includes first Velcro pad means mounted to said inside surface substantially adjacent to said opening and said roll up sheet having cooperative second Velcro pad means mounted thereon so that when said roll up sheet is fully distended said first and second pad means come in engaging contact with each other thereby covering said opening.

3. The cover set forth in claim 2 wherein said roll up sheet includes weight means mounted to set lowermost ends of said roll up sheet thereby urging said roll up sheet to distend.

4. The cover set forth in claim 3 wherein said canvas sheet includes third Velcro pad means for cooperatively engaging with said second Velcro pads means when said roll up sheet is fully rolled up thereby keeping it securely in place.

5. The cover set forth in claim 4 wherein said means for rolling up and down said roll up sheet includes two strings, having two ends each, and two cooperating roller assemblies through which said strings are passed and said strings extend around the lowermost end of said roll up sheet and one of said ends of each one of said strings being rigidly attached to said canvas sheet so that when the other loose ends are simultaneously pulled said roll up sheet is rolled up and when said strings are released said roll up sheet is distended.

* * * * *